June 30, 1931.  F. F. HEITZ  1,812,633
WEIGHING SCALE
Filed April 8, 1929
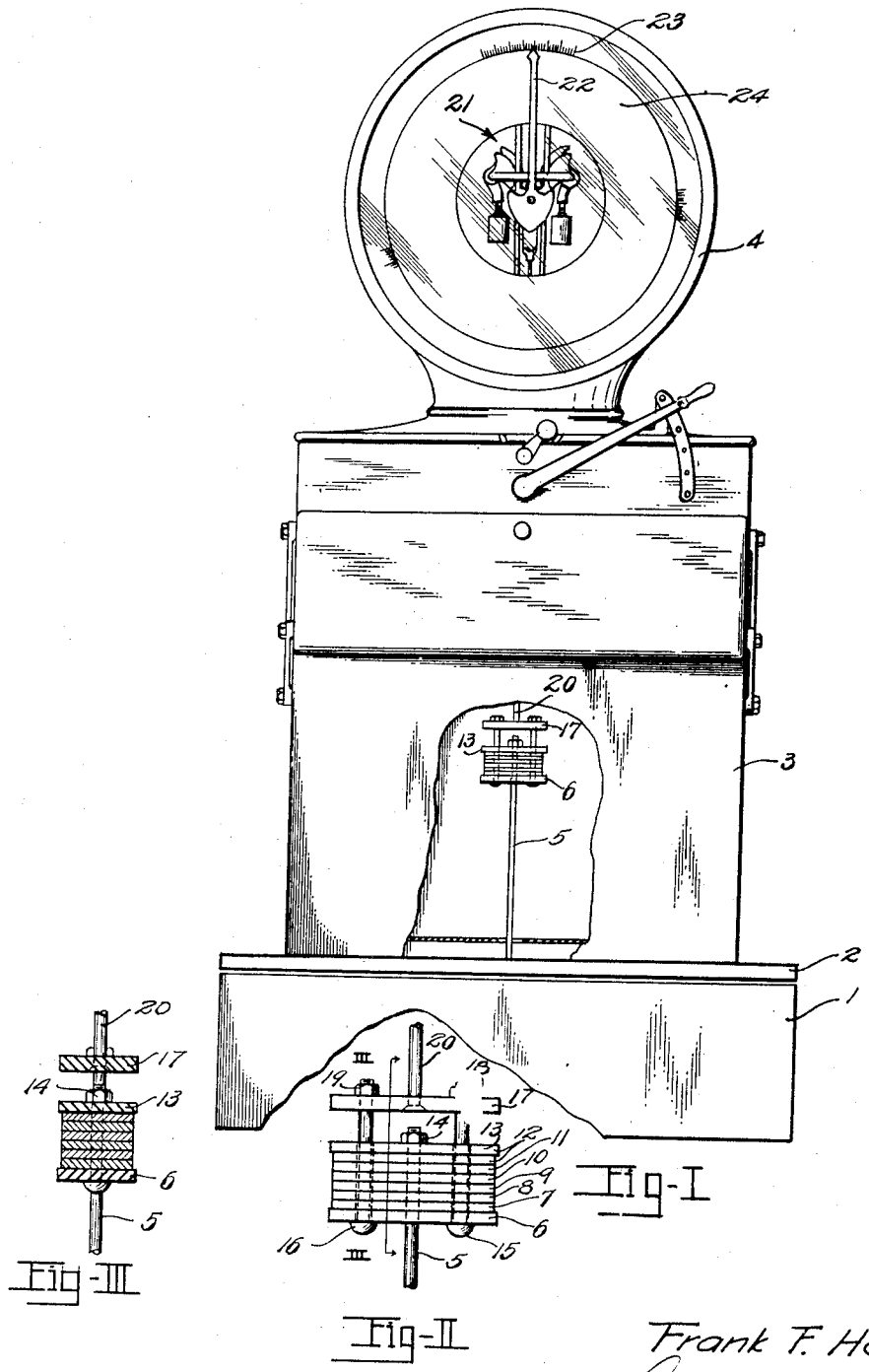
Inventor
Frank F. Heitz
By C. D. Marshall
Attorney Patented June 30, 1931

1,812,633

UNITED STATES PATENT OFFICE

FRANK F. HEITZ, OF DAYTON, OHIO, ASSIGNOR TO TOLEDO SCALE MANUFACTURING COMPANY, OF TOLEDO, OHIO, A CORPORATION OF NEW JERSEY

WEIGHING SCALE

Application filed April 8, 1929. Serial No. 353,316.

This invention relates to improvements in weighing scales, and particularly to scales capable of weighing heavy loads. Scales of this kind are occasionally subjected to shocks caused by carelessly dropping the load, to be weighed, on the platform.

One of the principal objects of this invention is the provision of simple and inexpensive shock absorbing means.

Another object is the provision of a scale in which the counterbalancing mechanism is protected against shock.

Other objects and advantages of the invention will appear from the following description, in which reference is had to the accompanying drawings illustrating a preferred embodiment of my invention and wherein similar reference numerals designate similar parts throughout the several views.

In the drawings:—

Figure I is a front elevation, with parts broken away, of a scale embodying my invention.

Figure II is an enlarged front elevation of the shock absorber; and

Figure III is a sectional view, substantially through the line III—III of Figure II.

Referring to the drawings in detail, the scale per se is substantially the one fully disclosed in United States Patent No. 1,423,660 granted to Hem, I therefore will describe it only in so far as is necessary to properly disclose my invention. The base 1 houses and supports the lever mechanism (not shown) on which a platform or load receiver 2 is mounted. An upwardly extending cabinet 3 is fixed on the base, in the rear of the platform and mounted thereon is the substantially watch case shaped housing 4. Engaging the nose pivot (not shown) of the base lever system is a rod 5. This rod extends upwardly through apertures in a metallic plate 6 and resilient material or rubber pads 7, 8, 9, 10, 11, 12, and another metallic plate 13, and is retained there by a nut 14. Adjacent to, and laterally thereof, are two bolts 15 and 16. These bolts, also, extend through suitable apertures in the aforementioned plates 6 and 13 and in the resilient pads 7, 8, 9, 10, 11, and 12, however, they extend further, through apertures in a metallic plate 17 and are there retained by the nuts 18 and 19. A rod 20, which is a continuation of the rod 5, is riveted or otherwise secured to the plate 17 at one of its ends, while the other end is pivotally secured to the intermediate lever (not shown).

It will be readily seen that the rods 5 and 20, the bolts 15 and 16 and the various metallic plates and resilient pads transmit the force exerted by the load on the platform to the intermediate levers and the load counterbalancing mechanism 21. An indicating hand 22, operatively connected to, and driven by the counterbalancing action of the mechanism 22 co-operates with the indicia 23 on a chart 24 to show the amount of the load on the platform.

It is obvious that the combination of the members as shown in Figure II is well suited to absorb undue shocks and thereby protect the scale mechanism. The shock is transmitted by the rod 5 to the plate 13 which rests on the plurality of pads made of resilient material which absorb and dissipate it.

Having described my invention, I claim:

1. In a weighing scale, in combination, a lever system, a load receiver mounted thereon, pendulum load counterbalancing mechanism including a relatively movable chart and indicating hand, and means, including a shock absorbing device, for operatively connecting said lever and said load counterbalancing mechanism, said shock absorbing device consisting of a plurality of metallic plates, two of said plates compressively engaging a plurality of resilient pads.

2. In a weighing scale, in combination, a lever system, a load receiver mounted thereon, pendulum load-counterbalancing mechanism including a relatively movable chart and indicating hand, and means including a shock absorbing device for operatively connecting said lever and said load-counterbalancing mechanism, said shock absorbing devices consisting of a plurality of metallic plates and a rubber insert interposed between two of said plates and adapted to be compressed therebetween.

FRANK F. HEITZ.